United States Patent [19]

Amano et al.

[11] Patent Number: 5,348,708
[45] Date of Patent: Sep. 20, 1994

[54] POLYMERIZING APPARATUS

[75] Inventors: Tadashi Amano, Kamisu; Shuji Ohnishi, Hasaki, both of Japan

[73] Assignee: Shin-Etsu Chemical Co., Ltd., Tokyo, Japan

[21] Appl. No.: 989,569

[22] Filed: Dec. 11, 1992

[30] Foreign Application Priority Data

Dec. 11, 1991 [JP] Japan .................. 3-350797

[51] Int. Cl.$^5$ .............. B01F 7/00; F28D 7/00
[52] U.S. Cl. ................... 422/132; 422/135; 422/138; 422/226; 422/235
[58] Field of Search ........... 422/132, 135, 138, 224, 422/225, 226, 258, 259, 285, 289, 235; 366/168, 315, 137, 144, 149

[56] References Cited

U.S. PATENT DOCUMENTS

| | | | |
|---|---|---|---|
| 3,204,772 | 9/1965 | Ruxton | 55/204 |
| 3,466,150 | 9/1969 | Dietze et al. | 422/235 X |
| 3,692,763 | 9/1972 | Van Saane et al. | 260/94.9 P |
| 3,744,636 | 7/1973 | Commarmot | 264/4.1 |
| 4,053,388 | 10/1977 | Bailey | 208/89 |
| 4,159,307 | 6/1979 | Shigeyasu et al. | 422/235 X |
| 4,179,102 | 12/1979 | Clumpher | 266/218 |
| 4,209,359 | 6/1980 | Sethy | 55/204 X |
| 5,013,497 | 5/1991 | Yiournas et al. | 210/180 |

*Primary Examiner*—Robert J. Warden
*Assistant Examiner*—Robert Carpenter
*Attorney, Agent, or Firm*—Oblon, Spivak, McClelland, Maier & Neustadt

[57] ABSTRACT

A polymerizing apparatus for polymerizing a monomer having an ethylenically unsaturated double bond which is equipped with a polymerization vessel having an agitator and a return nozzle to a gaseous phase part and with a circulating pipeline extending from said polymerization vessel and connected to said return nozzle of the polymerization vessel through a heat exchanger, in which said return nozzle is installed such that it discharges a reaction mixture in the direction which is tangential to the circumferential wall of the vessel and in which the agitator is rotated. Scale of a polymer can be prevented from depositing in the polymerization vessel and it is possible to reduce the number of fish eyes of a molded product such as a sheet into which the polymer obtained by the present polymerizing apparatus can be worked.

8 Claims, 3 Drawing Sheets

POLYMERIZING APPARATUS

BACKGROUND OF THE INVENTION

1. Field of the Invention

The present invention relates to a polymerizing apparatus for polymerizing a monomer having an ethylenically unsaturated double bond wherein a reaction mixture is polymerized while it is circulated through a heat exchanger installed separately from a polymerization vessel.

2. Description of the Prior Art

The polymerization reaction of a monomer having an ethylenically unsaturated double bond is carried out in such a manner that a polymerization medium such as water, a monomer having an ethylenically unsaturated double bond, a polymerization initiator, a dispersant, and, if required, other various additives are charged into a polymerization vessel equipped with a jacket and a reflux condenser, and then the reaction is initiated by elevating the temperature in the polymerization vessel to a prescribed temperature. Further, during the polymerization reaction, in order to retain the reaction system at a prescribed temperature, the heat of polymerization reaction is removed by passing cooling water through the jacket and the reflux condenser.

In recent years, in order to improve the productivity, measures are adopted that (1) the polymerization vessel is made large in size and (2) the polymerization time per batch is shortened. However, since the enlargement of the polymerization vessel has resulted in a decrease in the ratio of the heat transfer area to the reaction mixture, the above prior technique of removing the heat of polymerization reaction has become insufficient in capacity for removing the heat. In addition, if the polymerization time per batch is shortened, the capacity for removing the heat becomes insufficient further because the rate of the generation of heat due to the polymerization reaction per unit time increases.

Some techniques for overcoming the above disadvantages are suggested and, as effective techniques out of them, techniques wherein a reaction mixture is circulated through a heat exchanger installed outside a polymerization vessel (see Japanese Pre-examination Patent Publication (kokai) Nos. 54-24991 (1979), 56-47410 (1981), and 58-32606 (1983) and Japanese Patent Publication (kokoku) No. 64-11642 (1989)) can be mentioned. These techniques are quite effective in that the ratio of the heat transfer area to the reaction mixture can be increased.

However, according to these techniques, since the reaction mixture in the form of a slurry came back from the heat exchanger scatters when the reaction mixture is discharged into the gaseous phase part in the polymerization vessel from a return nozzle of a circulating pipeline, there is a problem that a large amount of scale of a polymer deposits on the gaseous phase part and near to the interface between the gaseous phase part and the liquid phase part in the polymerization vessel. Further, there is a problem that when the obtained polymer is worked into a molded product such as a sheet, fish eyes increases.

SUMMARY OF THE INVENTION

An object of the present invention is to provide a polymerizing apparatus for polymerizing a monomer having an ethylenically unsaturated double bond which is equipped with a polymerization vessel and a circulating pipeline extending from said polymerizing and returning to said polymerization vessel through a heat exchanger, in which scale of a polymer can be prevented from depositing in the polymerization vessel and by which a polymer can be produced which can be worked into a molded product with less fish eyes.

The present inventors have studied keenly in various ways and have solved the above subject.

The present invention provides a polymerizing apparatus for polymerizing a monomer having an ethylenically unsaturated double bond which comprises a polymerization vessel with a generally circular horizontal cross section and an external circulating system comprising a circulating pipeline extending from the liquid phase part of said polymerization vessel through a heat exchanger and connected to the gaseous phase part of said polymerization vessel, whereby a reaction mixture contained in said polymerization vessel can be circulated through said heat exchanger, said circulating pipeline having a return nozzle at the end connected to said gaseous phase part, wherein said return nozzle is installed such that it discharges a reaction mixture returning from said heat exchanger into said polymerization vessel in the direction which is tangential to said circular horizontal cross section of the polymerization vessel and in which the agitator is rotated.

According to the present invention, scale of a polymer can be prevented from depositing in the polymerization vessel and further, by the use of the present polymerizing apparatus, when the obtained polymer is processed into a molded product such as a sheet, fish eyes can be reduced. Therefore, a polymer can be produced efficiently with high productivity.

DETAILED DESCRIPTION OF PREFERRED EMBODIMENTS

Polymerization vessels

According to the study made by the present inventors, it has been found that deposition of scale of a polymer in a polymerization vessel and particularly deposition of scale of a polymer near to the interface between a gaseous phase part and a liquid phase part is greatly influenced by the state of the discharge of the reaction mixture in the form of a slurry into the polymerization vessel, namely by the direction in which the reaction mixture in the form of a slurry is discharged into the polymerization vessel. Hereinafter it is described specifically below.

Figure 4A:
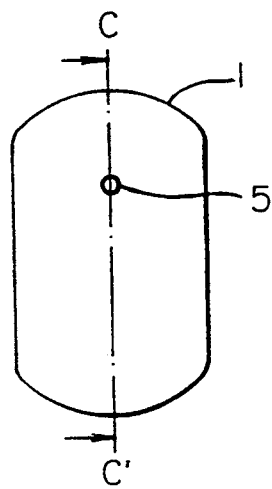
FIG. 4 is a simplified view exemplifying a polymerization vessel of a prior polymerizing apparatus, in which FIG. A is an elevational view of the polymerization vessel and FIG. B is a sectional view taken along line C–C' of FIG. A.
Figure 4B:
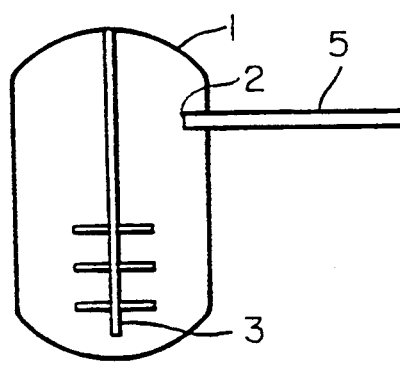
Figure 5A:
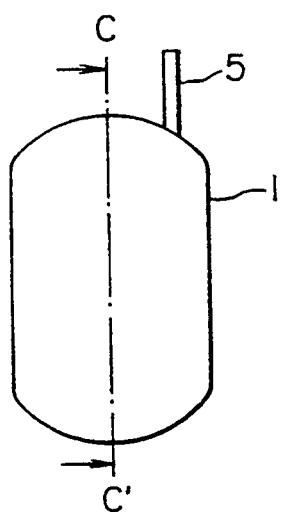
FIG. 5 is a simplified view exemplifying a polymerization vessel of a prior polymerizing apparatus, in which FIG. A is an elevational view of the polymerization vessel and FIG. B is a sectional view taken along line C–C' of FIG. A.
Figure 5B:
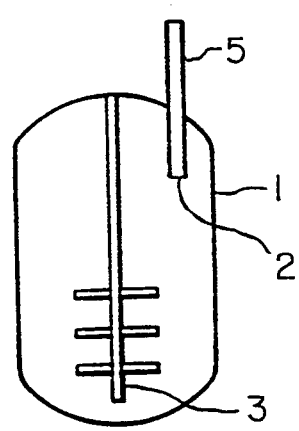

FIGS. 4 and 5 illustrate, by way of example, prior polymerization vessels with a circular horizontal cross section equipped with an agitator and a return nozzle to a gaseous phase part. FIG. 4 shows schematically a polymerization vessel in which a return nozzle 2 is inserted from the side wall of the polymerization vessel 1 and is directed approximately to the center of the polymerization vessel. FIG. 5 shows schematically a polymerization vessel in which a return nozzle 2 is position at the end of a circulating pipe 5 inserted from the upper wall of the polymerization vessel 1 and is directed downward in the polymerization vessel. In the polymerizing apparatus using a prior polymerization vessel as illustrated in FIGS. 4 and 5, when a reaction mixture is discharged from the return nozzle, the mixture scatters, and since the scatter causes the stirred fluidity of the reaction mixture in the polymerization vessel to become worse, a large amount of scale of a polymer is deposited on the walls of a gaseous phase part and a liquid phase part of the polymerization vessel near the interface between them. Further, the deposited polymer scale is peeled off and mixes with the polymer during the polymerization, and as a result when the obtained polymer is processed into a molded product such as a sheet, fish eyes increase.

The polymerization vessel in the present invention has a return nozzle installed tangentially to the wall of the polymerization vessel with a generally circular horizontal cross section and in the direction in which an agitator is rotated. That is, the return nozzle is installed such that a reaction mixture is discharged in the direction which is tangential to said circular horizontal cross section of the vessel and in which the agitator is rotated. Thus, since, in the present polymerizing apparatus, a reaction mixture is introduced tangentially to the circular inner wall surface of the polymerization vessel in the direction in which the agitator of the polymerization vessel is rotated, the scatter of the reaction mixture at the time when the reaction mixture is discharged into the polymerization vessel can be prevented and the stirred fluidity is not hindered.

It is suitable that the return nozzle is positioned at the level in the gaseous phase part in the polymerization vessel, and preferably is positioned at the gaseous phase part near to the interface between the gaseous phase part and the liquid phase part. Although the return nozzle may be inserted or projected into the inside of the polymerization vessel. may be positioned on the side wall without being projected, it is preferable that the return nozzle is positioned on the inner wall surface of the vessel in view, for example, of the prevention of deposition of polymer scale and cleaning of the polymerization vessel.

Figure 1A:
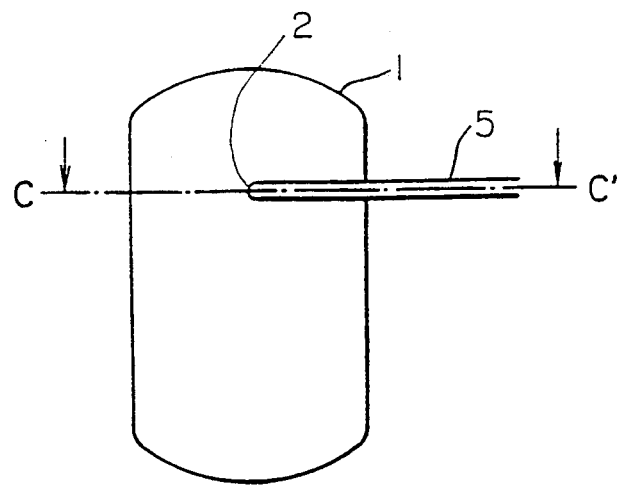
FIG. 1 is a simplified view exemplifying a polymerization vessel of the present polymerizing apparatus, wherein FIG. A is an elevational view of the polymerization vessel and FIG. B is a sectional view taken along line C–C' of FIG. A.
Figure 1B:
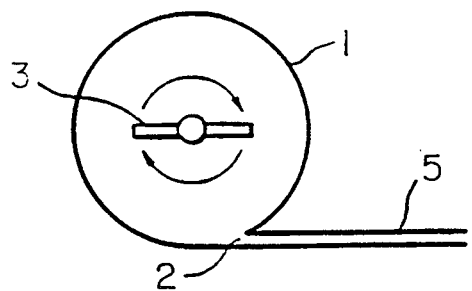
Figure 2A:
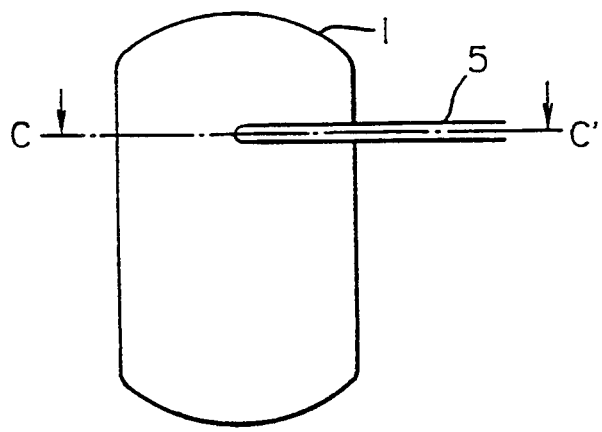
FIG. 2 is a simplified view of a polymerization vessel of the present polymerizing apparatus, wherein FIG. A is an elevational view of the polymerization vessel and FIG. B is a sectional view taken along line C–C' of FIG. A.
Figure 2B:
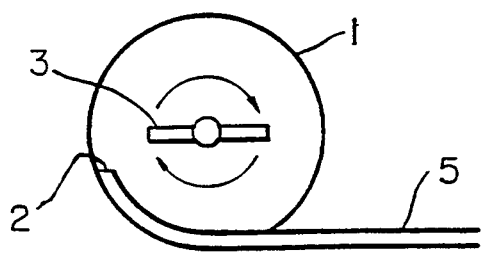

Specific embodiments of the present polymerization vessel equipped with an agitator and a return nozzle to a gaseous phase part are shown in FIGS. 1 and 2. FIG. 1 exemplifies a polymerization vessel wherein a return nozzle 2 is not inserted into the polymerization vessel 1 but the return nozzle is attached to the side wall of the polymerization vessel 1 and a reaction mixture is introduced in the same direction as the direction of the rotation of the agitator. FIG. 2 exemplifies a polymerization vessel wherein a circulating pipeline 5 is inserted along the inner wall surface of the polymerization vessel 1 and a return nozzle 2 at its forward end is positioned on the inner wall, and, in the same way as that shown in FIG. 1, a reaction mixture is introduced in the same direction as the direction of the rotation of the agitator.

The agitator to be attached to the polymerization vessel of the present invention is of a stirring blade type such as a paddle type, a Pfaudler type, a Brumagin type, a propeller type, and a turbine type, and, if necessary, is used in combination with a baffle such as a flat plate, a cylinder, and a hair pin coil.

In addition to the agitator and the return nozzle to the gaseous phase part, similarly to prior known polymerization vessels, the polymerization vessel of the present invention may be equipped with a reflux condenser, a baffle, a jacket, and the like.

Polymerizing apparatuses

The present polymerizing apparatus is an apparatus equipped with the above polymerization vessel and a circulating pipeline extending from the polymerization vessel and returning to the polymerization vessel through a heat exchanger.

Now, the present polymerizing apparatus will be described specifically based on the illustrated drawings.

Figure 3:
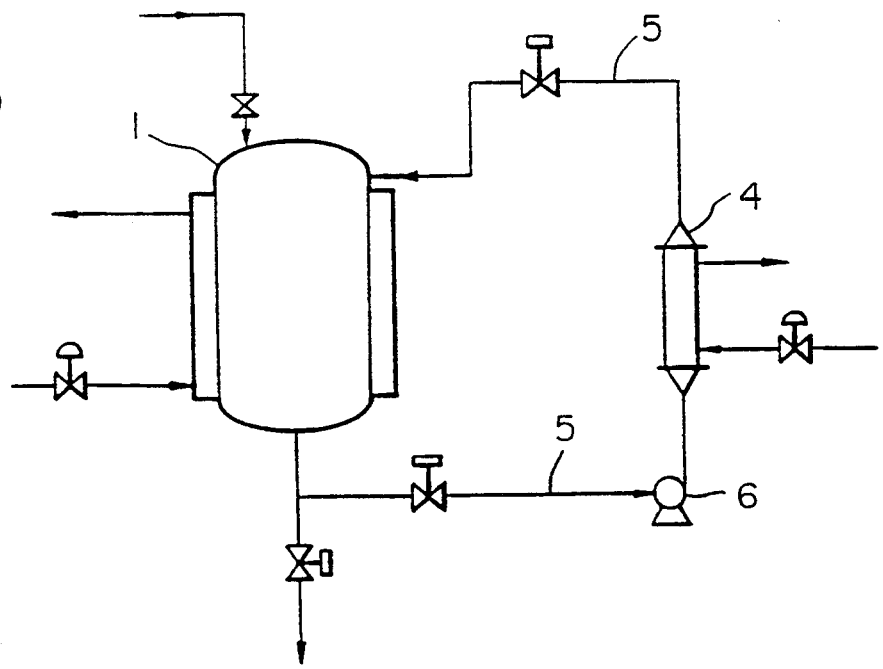
FIG. 3 is a schematic view exemplifying the present polymerizing apparatus as a whole.

FIG. 3 shows schematically an embodiment of the polymerizing apparatus according to the present invention. The present polymerizing apparatus is equipped with a polymerization vessel 1, a heat exchanger 4 for heating or cooling a reaction mixture, and a circulating pipeline 5 extending from a bottom part of the polymerization vessel 1 and returning to the polymerization vessel 1 through the heat exchanger 4. The present polymerizing apparatus is also equipped with a circulating pump 6. In the present polymerizing apparatus, a reaction mixture of a monomer, a polymerization medium such as water, a dispersant, a polymerization initiator, etc. charged into the polymerization vessel 1 is extracted from the bottom part of the polymerization vessel 1 by the circulating pump 6 and is returned into the polymerization vessel 1 through the circulating pipeline 5.

The inner diameter of the circulating pipeline 5 of the present polymerizing apparatus is generally 1 to 20 inches. The linear velocity of the flow of the circulated reaction mixture is generally 0.7 m/sec or over, preferably 0.7 to 4 m/sec. If the linear velocity is too small, deposition of polymer scale will be facilitated.

As the heat exchanger 4, a generally used heat exchanger such as a multi-pipe type heat exchanger, a coil type heat exchanger, a spiral type heat exchanger, or a trombone cooler can be used, and as a heating/cooling medium therefor, for example, steam, cooling water, and brine can be used. The circulating pipeline 5 itself may be a double pipe, so that the efficiency of the removal of heat may be increased by passing cooling water or brine through the outer space thereof.

The circulating pump 6 is preferably of a low-shear type, and more preferably is a pump having a structure with an impeller made up of a single helical blade attached to a conical hub. As an example of a pump having such a structure, a pump commercially available under the trade name of "Hidrostal Pump" (manufactured by Taiheiyo Kinzoku Co.) can be mentioned.

The polymerization vessel 1, the heat exchanger 4, the circulating pipeline 5, the circulating pump 6, and other parts which will be in contact with the reaction mixture such as a valve are preferably made of a stainless steel, for example, the stainless steel of the "18-8"

austenite type, the "13" chromium ferrite type, the martensite type, the "18" chromium ferrite type, the high-chromium ferrite type, or the dual-phase austenite/ferrite type in view of the heat transfer and corrosion resistance. These parts may also be coated with an agent for preventing deposition of polymer scale which is conventionally known or such an agent may be mixed with the reaction mixture.

Further, in order to reduce areas as far as possible where the reaction mixture stays the instruments are preferably arranged in such a manner that, for example, the circulating pipeline 5 is not unnecessarily branched or made longer.

The monomer having an ethylenically unsaturated double bond which will be polymerized in the present polymerizing apparatus includes a vinyl halide such as vinyl chloride; a vinyl ester such as vinyl acetate and vinyl propionate; acrylic acid and methacrylic acid and their esters or salts; maleic acid and fumaric acid and their esters or anhydrides; a diene monomer such as butadine, chloroprene, and isoprene; and styrene, acrylonitrile, a vinylidene halide, and a vinyl ether. The present polymerizing apparatus is suitable for the production particularly of a vinyl chloride polymer, for example, of a vinyl chloride among the above monomers. The vinyl chloride polymer includes, in addition to a vinyl chloride homopolymer, a copolymer (generally containing 50% by weight of vinyl chloride) of a vinyl chloride with other vinyl monomer. The comonomer that can be copolymerized with the vinyl chloride includes an α-olefin such as ethylene, propylene, 1-butene, 1-pentene, 1-hexene, 1-heptene, 1-octene, 1-nonene, 1-decene, 1-undecene, 1-dodecene, 1-tridecene, and 1-tetradecene; an acrylic acid or its ester such as acrylic acid, methyl acrylate, and ethyl acrylate; a methacrylic acid or its ester such as methacrylic acid, methyl methacrylate, and ethyl methacrylate; maleic acid or its ester; a vinyl ester such as vinyl acetate and vinyl propionate; a vinyl ether such as vinyl lauryl ether and vinyl isobutyl ether; maleic anhydride; acrylonitrile; vinylidene chloride; and other monomer copolymerizable with vinyl chloride, which may be used singly or as a mixture of two or more.

The method of the polymerization that will be carried out by the present polymerizing apparatus is not particularly restricted, and the present polymerizing apparatus can be used, for example, for the suspension polymerization, the emulsion polymerization, the mass polymerization, and the solution polymerization, and is particularly suitable for the polymerization that is carried out in an aqueous medium such as the suspension polymerization and the emulsion polymerization.

Now, a general polymerization method will specifically be described herein below by giving, as examples, suspension polymerization and emulsion polymerization.

First, water and a dispersant are charged into the polymerization vessel and then a polymerization initiator is charged. Then, after the inside of the polymerization vessel is evacuated so that the pressure may be reduced to 0.1 to 760 mmHg, a monomer is charged (at that time, generally the internal pressure of the polymerization vessel will become 0.5 to 30 kgf/cm$^2$·G), and the polymerization is carried out at a reaction temperature of 30° to 150° C. During the polymerization, if necessary, water, a dispersant, and one or more polymerization initiators are added. The reaction temperature of the polymerization may vary depending on the type of the monomer to be polymerized, and, for instance, in the case of polymerization of vinyl chloride, the polymerization is effected at 30° to 80° C., and in the case of polymerization of styrene, the polymerization is effected at 50 to 150° C. The polymerization can be judged to be completed when the internal pressure of the polymerization vessel drops to 0 to 7 kgf/cm$^2$·G, or when the difference between the inlet temperature and the outlet temperature of the cooling water flowing into and out from the jacket provided around the outer circumference of the polymerization vessel becomes almost zero (i.e., when heat is not generated by the polymerization reaction). Generally, the water, the dispersant, and the polymerization initiator that are charged when the polymerization is carried out are in amounts 20 to 500 parts by weight, 0.01 to 30 parts by weight, and 0.01 to 5 parts by weigh, respectively, per 100 parts by weight of the monomer.

Other conditions that are used in the polymerization, for example, the method of charging an aqueous medium, a monomer, a polymerization initiator, a dispersant, or the like into the polymerization vessel and the charging ratio of them may be the same as those of the prior art. It is also optional to add to the polymerization system, if necessary, a polymerization modifier, a chain transfer agent, a pH adjustor, a gelation improver, an antistatic agent, a crosslinking agent, a stabilizer, a filler, an antioxidant, a buffer, a scale preventive, and the like which are suitably used in the polymerization of a vinyl chloride.

EXAMPLES

Now, specific modes of the present invention will now be described herein below based on the Example and the Comparative Example, but the present is not restricted to them.

Example 1

A jacketed polymerization vessel 1 of a stainless steel having an internal volume of 2.1 m$^3$, a shell and tube multi-pipe type heat exchanger 4 having a heat transfer area of 5.0 m$^2$, and a 5 m$^3$/Hr×2 m Hidrostal Pump (having a flow rate variable apparatus using an invertor) 6 as a circulating pump were connected through a pipeline 5 having an internal diameter of 3 inches, valves, etc. as shown in FIG. 3. Said polymerization vessel 1 had a return nozzle 2 as shown in FIG. 1.

An aqueous solution made up of 840 kg of deionized water, 240 g of a partially saponified polyvinyl alcohol, and 160 g of a cellulose ether was placed in said polymerization vessel. Then after the polymerization vessel was evacuated until the internal pressure reached 50 mmHg, 670 kg of vinyl chloride monomer was charged into the polymerization vessel. While the thus obtained mixture was stirred, 2010 g of di-2-ethylhexyl peroxydicarbonate was pumped thereinto. Thereafter, hot water was passed into the jacket of the polymerization vessel to elevate the temperature of the reaction mixture in the polymerization vessel. After the polymerization reaction is started, cooling water was passed through the jacket, and after 30 min the reaction mixture was circulated through the heat exchanger at 23 m$^3$/Hr and at the same time cooling water having a temperature of 30° C. was supplied to the heat exchanger at a rate of 10 m$^3$/hr. The polymerization was continued with the internal temperature of the polymerization vessel kept at 55° C. When the internal pressure of the polymerization vessel dropped to 6.5 kg/cm$^2$·G, unreacted monomer was recovered, the produced vinyl chloride polymer in the form of a slurry was extracted outside the polymerization vessel and was dehydrated and dried.

With respect to the obtained vinyl chloride polymer, the bulk specific gravity, the particle size distribution, the plasticizer absorption, and the number of fish eyes of a sheet molded from the obtained vinyl chloride polymer were measured in accordance with the following way. The results are shown in Table 1.

(1) Bulk specific gravity: the measurement followed JIS K-6721.

(2) Particle size distribution: the polymer was sieved using #60, #80, #100, #150, and #200 sieves according to JIS Z-8801 and the passed amounts (% by weight) were measured.

(3) Plasticizer absorption: glass fiber was loaded into the bottom of an aluminum alloy container having an inner diameter of 25 mm and a depth of 85 mm and 10 g of the obtained vinyl chloride polymer was charged thereinto. 15 cc of dioctyl phthalate (hereinafter referred to as DOP) was added thereto, and they were allowed to stand for 30 min thereby permitting the DOP to penetrate well through the polymer. Thereafter, excess DOP was centrifuged under an acceleration of 1500 g and the amount of the DOP absorbed into the 10 g polymer was measured and was expressed in terms of value per 100 g of the polymer.

(4) Fish eyes: 25 g of a mixture prepared by mixing 100 parts by weight of the obtained vinyl chloride polymer, 50 parts by weight of dioctyl phthalate, 0.5 part by weight of tribasic lead sulfate, 1.5 parts by weight of lead stearate, 0.1 part by weight of titanium oxide, and 0.05 part by weight of carbon black was kneaded at 140° C. for 5 min by a 6-inch kneading roll and was formed into a sheet having a width of 15 cm and a thickness of 0.2 mm. Transparent particles in the obtained sheet per 100 cm$^2$ was counted.

The state of the deposition of scale of the polymer in the polymerization vessel after the completion of the polymerization was investigated. The results are shown in Table 1.

Comparative Example 1

The polymerization of Example 1 was repeated, except that a polymerization vessel having a return nozzle attached as shown in FIG. 4 was used.

With respect to the obtained polymer, in the same way as in Example 1, the bulk specific gravity, the particle size distribution, the plasticizer absorption, and the number of fish eyes of a sheet molded from the obtained vinyl chloride polymer were measured. The results are shown in Table 1.

The state of the deposition of scale of the polymer in the polymerization vessel after the completion of the polymerization was investigated. The results are shown in Table 1.

TABLE 1

|  | Example 1 | Comparative Example 1 |
| --- | --- | --- |
| Bulk specific gravity | 0.529 | 0.508 |
| Particle size distribution (passed amount in wt. #) |  |  |
| #60 | 100 | 99.9 |
| #80 | 72.8 | 70.1 |
| #100 | 44.6 | 39.7 |
| #150 | 20.1 | 20.8 |
| #200 | 0.8 | 1.0 |
| Plasticizer absorption (g) | 23.9 | 23.0 |

TABLE 1-continued

|  | Example 1 | Comparative Example 1 |
| --- | --- | --- |
| Fish eyes (number) | 10 | 100 |
| State of scale deposited in the polymerization vessel | Very little scale deposited on the liquid phase part, the gaseous phase part, and the interface part. | Scale deposited on all the interface part and blocks of the polymer scale deposited on the gaseous phase part. |

We claim:

1. A polymerizing apparatus for polymerizing a monomer having an ethylenically unsaturated double bond which comprises a polymerization vessel having an agitator and including upper and lower portions, and wherein the upper portion contains a gaseous phase part and the lower portion contains a liquid phase part, said polymerization vessel further including a generally circular horizontal cross section and an external circulating system comprising a circulating pipeline extending from the lower portion of said polymerization vessel through a heat exchanger and connected to the upper portion of said polymerization vessel in series, whereby a reaction mixture contained in said polymerization vessel can be circulated through said heat exchanger, said circulating pipeline having a return nozzle at an end connected to said upper portion, wherein said return nozzle is installed such that the return nozzle discharges a reaction mixture returning from said heat exchanger into said polymerization vessel in a direction which is tangential to said circular horizontal cross section of the polymerization vessel and in which said agitator is rotated.

2. A polymerizing apparatus as claimed in claim 1, wherein said return nozzle is positioned on a side wall of the polymerization vessel.

3. A polymerizing apparatus as claimed in claim 1, wherein said circulating pipeline is inserted into the polymerization vessel along a polymerization vessel inner wall surface and the return nozzle is positioned on the inner wall surface.

4. A polymerizing apparatus as claimed in claim 1, wherein said return nozzle is positioned adjacent an interface between the upper and lower portions.

5. A polymerizing apparatus for polymerizing a monomer having an ethylenically unsaturated double bond which comprises a polymerization vessel having an agitator and including upper and lower portions, and wherein the upper portion contains a gaseous phase part and the lower portion contains a liquid phase part, the polymerization vessel having a generally circular horizontal cross section, and an external circulating system comprising a circulating pipeline extending from the lower portion of said polymerization vessel through a heat exchanger and connected to the upper portion of said polymerization vessel in series, whereby a reaction mixture contained in said polymerization vessel can be circulated through said heat exchanger, said circulating pipeline having a return nozzle at an end connected to said upper portion, wherein said return nozzle is installed such that said return nozzle discharges a reaction mixture returning from said heat exchanger into said polymerization vessel in a direction which is tangential to said circular horizontal cross section of the polymerization vessel and in which said agitator is rotated, wherein said circulating pipeline includes a pipeline portion immediately upstream of the polymerizing vessel, said pipeline portion immediately upstream of the polymerizing vessel extending tangential to said circular horizontal cross section at a location at which said pipeline portion enters said polymerization vessel.

6. A polymerizing apparatus for polymerizing a monomer having an ethylenically unsaturated double bond which comprises a polymerization vessel having an agitator and, including upper and lower portions, and wherein the upper portion contains a gaseous phase part and the lower portion contains a liquid phase part, the polymerization vessel having a generally circular horizontal cross section, and an external circulating system comprising a circulating pipeline extending from the lower portion of said polymerization vessel through a heat exchanger and connected to the upper portion of said polymerization vessel in series, whereby a reaction mixture contained in said polymerization vessel can be circulated through said heat exchanger, said circulating pipeline having a return nozzle at an end connected to said upper portion, wherein said return nozzle is installed such that the return nozzle discharges a reaction mixture returning from said heat exchanger into said polymerization vessel in a direction which is tangential to said circular horizontal cross section of the polymerization vessel and in which said agitator is rotated, wherein said circulating pipeline includes a pipeline portion extending inside of said polymerization vessel and extending along an inner wall surface of said polymerization vessel, said pipeline portion including said return nozzle at an end thereof at which said reaction mixture is discharged, and wherein said return nozzle directs said reaction mixture along said inner wall surface of said polymerization vessel.

7. A polymerizing method for polymerizing a monomer having an ethylenically unsaturated double bond which comprises:
providing a polymerization vessel having an agitator and which includes upper and lower portions, such that the upper portion contains a gaseous phase part and the lower portion contains a liquid phase part, the step of providing a polymerization vessel including providing a polymerization vessel having a generally circular horizontal cross section and an external circulating system which includes a circulating pipeline extending from the lower portion of said polymerization vessel through a heat exchanger and connected to the upper portion of said polymerization vessel in series;
providing a reaction mixture within said polymerizing apparatus such that the liquid phase part is contained within said lower portion and the gaseous phase part is contained in said upper portion;
removing a reaction mixture from said liquid phase part and circulating said reaction mixture through said heat exchanger utilizing a circulation pipeline and thereafter returning said reaction mixture to said polymerization vessel with a return nozzle which discharges said reaction mixture in a tangential direction to said circular horizontal cross section and along an inner wall surface of said polymerization vessel.

8. The method of claim 7, further including discharging said reaction mixture through said return nozzle adjacent a topmost level of said liquid phase part disposed within said polymerization vessel.

* * * * *